(12) United States Patent
Tao et al.

(10) Patent No.: US 11,475,877 B1
(45) Date of Patent: Oct. 18, 2022

(54) END-TO-END SYSTEM FOR SPEECH RECOGNITION AND SPEECH TRANSLATION AND DEVICE

(71) Applicant: INSTITUTE OF AUTOMATION, CHINESE ACADEMY OF SCIENCES, Beijing (CN)

(72) Inventors: Jianhua Tao, Beijing (CN); Shuai Zhang, Beijing (CN); Jiangyan Yi, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/852,140

(22) Filed: Jun. 28, 2022

(30) Foreign Application Priority Data

Dec. 13, 2021 (CN) .......................... 202111516645.7

(51) Int. Cl.
*G10L 15/02* (2006.01)
*G10L 15/18* (2013.01)
*G10L 15/26* (2006.01)
*G10L 19/00* (2013.01)

(52) U.S. Cl.
CPC .......... *G10L 15/02* (2013.01); *G10L 15/1815* (2013.01); *G10L 15/26* (2013.01); *G10L 19/00* (2013.01)

(58) Field of Classification Search
CPC ..... G10L 15/02; G10L 15/1815; G10L 15/26; G10L 19/00; G06F 16/29
See application file for complete search history.

(56) References Cited

U.S. PATENT DOCUMENTS

| 2018/0330729 A1* | 11/2018 | Golipour ................. G10L 15/26 |
| 2020/0066253 A1* | 2/2020 | Peng ..................... G06N 3/0454 |
| 2020/0219486 A1* | 7/2020 | Fu ............................ G06F 3/167 |
| 2020/0335082 A1* | 10/2020 | Li ......................... G06N 3/0445 |
| 2020/0342852 A1* | 10/2020 | Kim ....................... G10L 13/047 |

(Continued)

FOREIGN PATENT DOCUMENTS

| CN | 112037768 A | 12/2020 |
| CN | 112686058 A | 4/2021 |

(Continued)

OTHER PUBLICATIONS

First Office Action issued in counterpart Chinese Patent Application No. 202111516645.7, dated Jan. 19, 2022.

*Primary Examiner* — Michael Colucci
(74) *Attorney, Agent, or Firm* — Westbridge IP LLC

(57) ABSTRACT

Disclosed are an end-to-end system for speech recognition and speech translation and an electronic device. The system comprises an acoustic encoder and a multi-task decoder and a semantic invariance constraint module, and completes two tasks for speech recognition and speech translation. In addition, according to the characteristic of the semantic consistency of texts between different tasks, semantic constraints are imposed on the model to learn high-level semantic information, and the semantic information can effectively improve the performance of speech recognition and speech translation. The application has the following advantages that the error accumulation problem of serial system is avoided, and the calculation cost of the model is low and the real-time performance is very high.

8 Claims, 3 Drawing Sheets

(56) References Cited

U.S. PATENT DOCUMENTS

| | | | | |
|---|---|---|---|---|
| 2021/0005182 A1* | 1/2021 | Han | ................... | G10L 25/24 |
| 2021/0012199 A1* | 1/2021 | Zhang | ................ | G06F 16/29 |
| 2021/0133535 A1* | 5/2021 | Zhao | ................ | G06N 3/0445 |
| 2022/0076657 A1* | 3/2022 | Wang | ................ | G10L 13/033 |
| 2022/0246244 A1* | 8/2022 | Kappel | ............ | G06N 3/0445 |

FOREIGN PATENT DOCUMENTS

| | | | |
|---|---|---|---|
| CN | 113537024 A | * | 10/2021 |
| CN | 113569562 A | | 10/2021 |
| WO | 2020205233 A1 | | 10/2020 |

\* cited by examiner

END-TO-END SYSTEM FOR SPEECH RECOGNITION AND SPEECH TRANSLATION AND DEVICE

CROSS-REFERENCE TO RELATED APPLICATIONS

The present disclosure claims priority to Chinese Patent Application 202111516645.7, entitled "End-to-end system for speech recognition and speech translation and device", filed on Dec. 13, 2021, the entire content of which is incorporated herein by reference.

TECHNICAL FIELD

The disclosure relates to the field of speech recognition, in particular to an end-to-end system for speech recognition and speech translation.

BACKGROUND

The existing speech recognition task and speech translation task are generally processed separately, common techniques are: 1. serial processing, that is, first using speech recognition system for speech recognition, and then sending the recognized text to translation system for translation; 2. models share acoustic coding parameters, that is, first using speech recognition data to pre-train acoustic encoder, and then using text translation data to train decoder, which is essentially a serial scheme.

Disadvantages of the prior art include:

(1) the serial scheme will bring the problem of error accumulation, that is, the recognition error of the speech recognition system will be transmitted to the translation system, resulting in the final result error;

(2) the computational cost of the serial scheme is high, and the whole system includes the computational cost of speech recognition and speech translation systems; and (3) the real-time performance of serial system is poor, because speech recognition is needed first, and the result text is sent to the translation system after recognition, so the real-time performance of the system is very poor.

SUMMARY

In order to solve the above technical problems, the present application provides a technical scheme of an end-to-end system for speech recognition and speech translation to solve the technical problems above.

A first aspect of the present application discloses an end-to-end system for speech recognition and speech translation, the system includes:

an acoustic encoder and a multi-task decoder;

the acoustic encoder is configured for: receiving a down-sampled and re-encoded feature sequence, to obtain high-dimensional representations of the acoustic features after the down-sampled and re-encoded feature sequence is inputted into a multi-head self-attention module of the acoustic encoder based on a multi-head self-attention mechanism, wherein the down-sampled and re-encoded feature sequence is obtained by extracting the acoustic features of a speech waveform to obtain an acoustic feature sequence and then performing a convolution operation and re-encoding operation on the acoustic feature sequence;

the multi-task decoder includes a plurality of identical multi-attention-based modules;

the multi-task decoder is configured for executing different tasks according to task labels after the task labels are added at the beginning of a plurality of target texts, wherein adding the task labels at the beginning of the plurality of target texts includes adding the task labels <ASR>, <CHN> and <ENG> at the beginning of the target texts, which correspond to a speech recognition task, a Chinese translation task and an English translation task, respectively;

the plurality of identical multi-attention-based modules include: a first self-attention module and a second self-attention module;

the first self-attention module of the multi-task decoder based on the self-attention mechanism is configured for receiving the encoded representations of the target text to obtain the high-dimensional representations of the target texts, wherein the encoded representations of the target text is obtained by re-encoding the plurality of target texts, and the high-dimensional representations of the target texts is obtained by inputting the encoded representations of the target text into the first self-attention module; the second self-attention module of the multi-task decoder based on the self-attention mechanism is configured for receiving the high-dimensional representations of the target texts and the high-dimensional representations of the acoustic features to obtain final decoded representations of multi tasks, wherein the final decoded representations of multi tasks is obtained by inputting the high-dimensional representations of the target texts and the high-dimensional representations of the acoustic features into the second self-attention module; the multi-task decoder is configured for calculating a mean value of the decoded representations to obtain semantic vector representations of the corresponding tasks.

Optionally, the system further includes: a semantic invariance constraint module;

the semantic invariance constraint module is configured for: calculating the KL divergence of the semantic vector representations corresponding to the plurality of target texts pairwise respectively to measure the consistency of semantic vector distribution, to obtain a semantic constraint loss, and performing semantic constraint by minimizing a consistency loss of the semantic vector distribution.

Optionally, the semantic constraint loss and a cross entropy loss are weighted and summed as a final target loss function.

Optionally, a specific method for performing the convolution operation and re-encoding operation on the acoustic feature sequence, to obtain the down-sampled and re-encoded feature sequence includes:

performing the convolution operation using a plurality of 2-dimensional convolution kernels on the acoustic feature sequence, and controlling a proportion of down-sampling by setting a step size of the convolution operation; after the convolution operation, connecting an activation function and carrying out a nonlinear transformation; superimposing a multi-layer convolution operation, then using a fully connected mapping layer to map the acoustic features into high-dimensional vectors, and then adding positional encoding information to the a vector sequence, where the positional encoding is represented using an absolute position to realize the down-sampling and re-encoding of the acoustic feature sequence.

Optionally, the multi-head self-attention module of the acoustic encoder based on the multi-head self-attention mechanism is formed by stacking a plurality of modules with the same structure, and a residual connection is carried out among each module with the same structure; each module with the same structure includes two sub-parts, a specific structure of which includes: a first sub-part is a multi-head self-attention layer, followed by a second sub-part which is a fully connected mapping layer, and a layer normalization operation is performed on each sub-part, and the residual connection is carried out between the two sub-parts.

Optionally, the activation function of the first self-attention module of the multi-task decoder based on the self-attention mechanism uses GLU, each sub-layer performs the layer normalization operation, and the residual connection is performed between the two sub-layers; using a dropout operation on a self-attention layer and a fully connected layer in the first self-attention module.

Optionally, a specific method for inputting the high-dimensional representations of the target texts and the high-dimensional representations of the acoustic features into the second self-attention module of the multi-task decoder based on the self-attention mechanism to obtain the final decoded representations of the multi tasks includes;

using the high-dimensional representations of the target text as a query vector, using the high-dimensional representations of the acoustic feature as a key and a value, performing an element-wise cosine distance calculation by using the query vector, obtaining an attention score of each key according to a size of the distance, and weighting and averaging a value sequence by using the attention score of the key to obtain a context vector representations as the final decoded representations of the multi tasks, A second aspect of the present application discloses an electronic device, the electronic device includes the end-to-end system for speech recognition and speech translation as described in the first aspect of the present application.

In conclusion, in the scheme as proposed in the present application, the end-to-end system for speech recognition and speech translation is capable of that:

(1) the error accumulation problem of serial system is avoided, and the calculation cost of the model is low and the real-time performance is very high; and (2) meanwhile, by using the characteristic of the semantic consistency of texts between different tasks, semantic constraints are imposed on the model to learn high-level semantic information.

BRIEF DESCRIPTION OF THE DRAWINGS

In order to describe the technical solutions more clearly in the embodiments of the present disclosure or the prior art, the accompanying drawings necessarily used for the description of the embodiments or related art will be briefly introduced in the following. It is obvious for those of ordinary skill in the art to obtain other accompanying drawings from these accompanying drawings without paying creative labor.

DETAILED DESCRIPTION OF THE EMBODIMENTS

Figure 1:
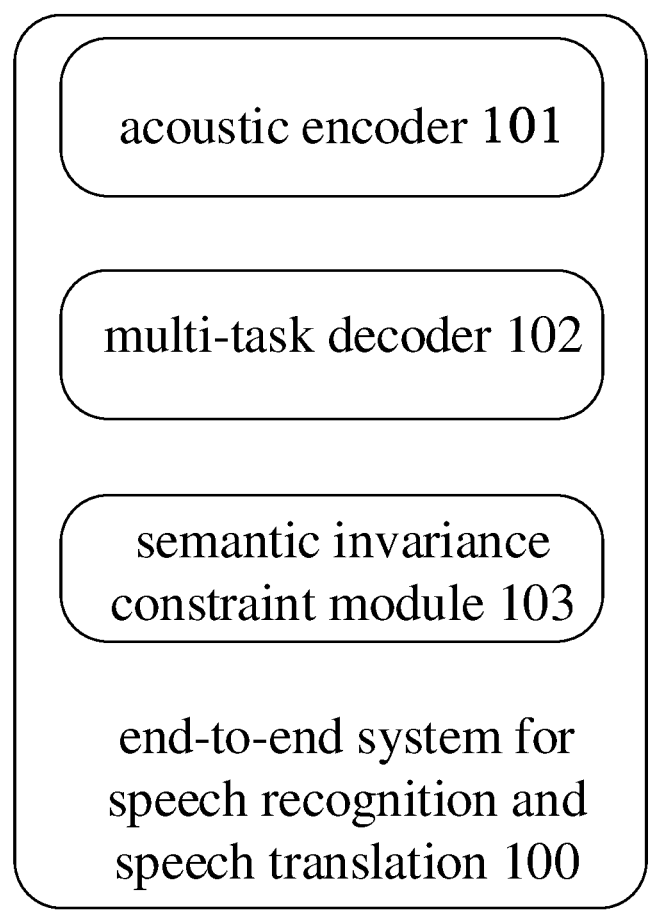
FIG. 1 is a structural diagram of an end-to-end system for speech recognition and speech translation according to an embodiment of the present disclosure.

In order to make the object, technical solution and advantages of the embodiments of the present disclosure clearer, the technical solution of the embodiments of the present disclosure will be clearly and completely described in conjunction with the accompanying drawings in the embodiments of the present disclosure. It is obvious that the described embodiments are merely part of the embodiments of the present disclosure, not all of them. Based on the embodiments in the present disclosure, all other embodiments obtained by those of ordinary skill in the art without making creative efforts fall within the scope of protection of the present disclosure.

Exemplary embodiments, examples of which are shown in the drawings, will be explained in detail here. When the following description relates to the drawings, the same numerals in different drawings denote the same or similar elements unless otherwise indicated. The embodiments described in the following exemplary embodiments are not representative of all embodiments consistent with the present application. Rather they are only examples of devices and methods consistent with some aspects of the application as detailed in the appended claims.

Terms used in the present application are for the purpose of describing specific embodiments only and are not intended to limit the application. The singular forms "an", "said" and "the" as used in the present application and the appended claims are also intended to include a plurality of forms, unless the context clearly indicates otherwise. It should also be understood that the term "and/or" as used herein refers to and encompasses any or all possible combinations of one or more associated listed items.

It should be understood that although the terms such as first second third may be used in the present application to describe various information, such information should not be limited to these terms. These terms are only used to distinguish the same type of information from each other. For example, without departing from the scope of the present application the first information may also be referred to as the second information and similarly the second information may also be referred to as the first information. Depending on the context, the word "if" as used herein can be interpreted as "when" or "at the time when" or "in response to determination".

Example 1

Figure 2:
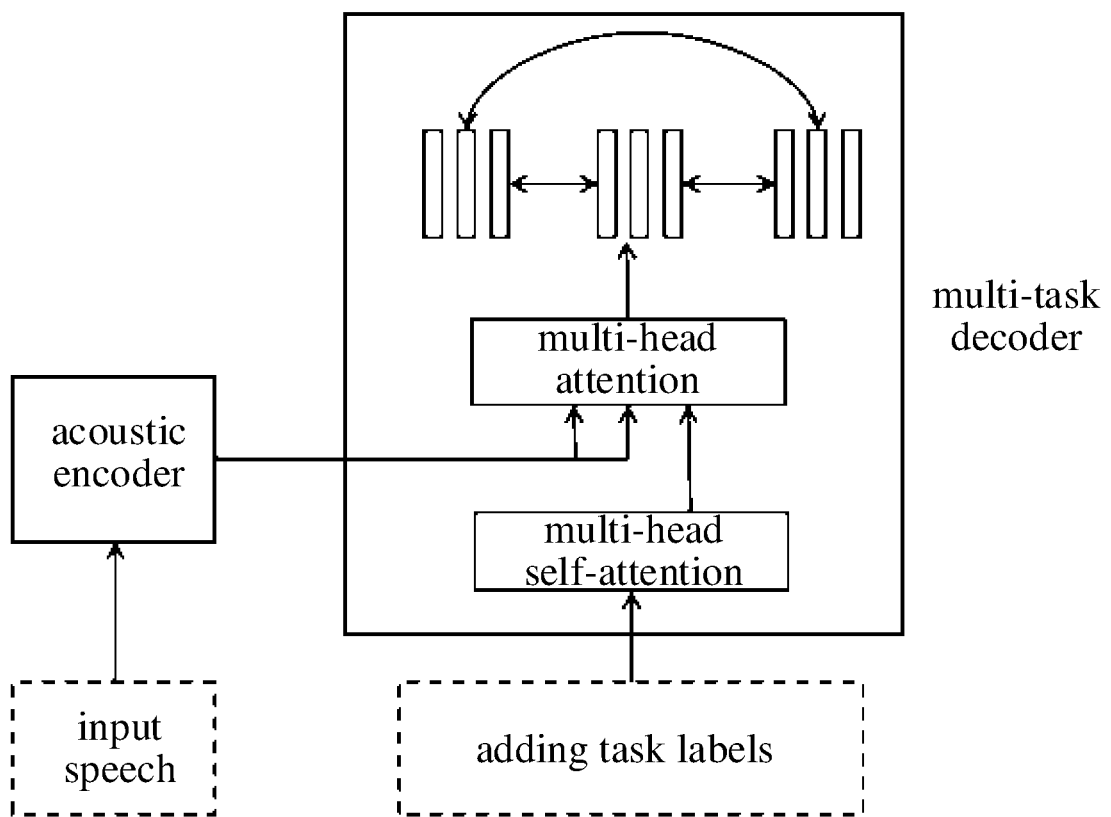
FIG. 2 is a structural diagram of an end-to-end system for speech recognition and speech translation according to an embodiment of the present disclosure.

A first aspect of the present application discloses an end-to-end system for speech recognition and speech translation. FIG. 1 is a structural diagram of an end-to-end system for speech recognition and speech translation according to an embodiment of the present application. Specifically as shown in FIG. 1 and FIG. 2, the system 100 includes an acoustic encoder 101 and a multi-task decoder 102.

The acoustic encoder 101 is configured for: receiving a down-sampled and re-encoded feature sequence, to obtain high-dimensional representations of the acoustic features after the down-sampled and re-encoded feature sequence is inputted into a multi-head self-attention module of the acoustic encoder based on a multi-head self-attention mechanism, and the down-sampled and re-encoded feature sequence is obtained by: first extracting the acoustic features of a speech waveform, to obtain an acoustic feature sequence, and then performing a convolution operation on the acoustic feature sequence, to obtain the down-sampled and re-encoded feature sequence;

wherein, the target text is the meaning of the target text sequence, and the high-dimensional representation is the sequence of high-dimensional representation.

In some embodiments, the specific method for extracting the acoustic features of the speech waveform includes the following steps: carrying out framing processing of the speech waveform, dividing continuous speech waveform points into short-time audio frames with fixed length, which is convenient for subsequent feature extraction; extracting thank (filter-bank) acoustic features from the short-time audio frames.

In some embodiments, the specific method for performing the convolution operation on the acoustic feature sequence to obtain the down-sampled and re-encoded feature sequence includes the following steps:

performing the convolution operation using a plurality of 2-dimensional convolution kernels on the acoustic feature sequence, and controlling the proportion of down-sampling by setting the step size of the convolution operation; after the convolution operation, connecting the activation function and carrying out nonlinear transformation; superimposing multi-layer convolution operation, then using fully connected mapping layer to map the acoustic features into high-dimensional vectors, and then adding positional encoding information to the vector sequence, where the positional encoding is represented using absolute position to realize down-sampling and re-encoding of the acoustic feature sequence.

In some embodiments, the multi-head self-attention module of the acoustic encoder based on the multi-head self-attention mechanism is formed by stacking a plurality of modules with the same structure, and residual connection is carried out among each module with the same structure; each module with the same structure includes two sub-parts, the specific structure of which includes: the first sub-part is a multi-head self-attention layer, followed by a second sub-part which is a fully connected mapping layer, and the layer normalization operation is performed on each sub-part, and the residual connection is carried out between two sub-parts.

The multi-task decoder 102 includes a plurality of identical multi-attention-based modules. The multi-task decoder 102 is configured for executing different tasks according to task labels after the task labels are added at the beginning of a plurality of target texts.

In some embodiments, the specific method for adding the task labels at the beginning of a plurality of target texts includes:

adding task labels <ASR>, <CHN> and <ENG> at the beginning of the target texts, which correspond to speech recognition task, Chinese translation task and English translation task respectively;

The plurality of identical multi-attention-based modules include a first self-attention module and a second self-attention module.

The first self-attention module of the multi-task decoder based on the self-attention mechanism is configured for receiving the encoded representations of the target text to obtain the high-dimensional representations of the target texts, wherein the encoded representations of the target text is obtained by re-encoding the plurality of target texts, and the high-dimensional representations of the target texts is obtained by inputting the encoded representations of the target text into the first self-attention module.

The second self-attention module of the multi-task decoder based on the self-attention mechanism is configured for receiving the high-dimensional representations of the target texts and the high-dimensional representations of the acoustic features to obtain final decoded representations of multi tasks, wherein the final decoded representations of multi tasks is obtained by inputting the high-dimensional representations of the target texts and the high-dimensional representations of the acoustic features into the second self-attention module.

The multi-task decoder is configured for calculating a mean value of the decoded representations to obtain semantic vector representations of the corresponding tasks.

In some embodiments, word embedding mapping is carried out in the three target texts, to obtain a target word vector sequence formed by corresponding target word vector representations. The encoded representations of the target text is obtained by adding positional encoding information and time sequence information to the target word vector sequence, and the high-dimensional representations of the target texts is obtained by inputting the encoded representations of the target text into the first self-attention module of the multi-task decoder based on the self-attention mechanism. The final decoded representations of the three tasks is obtained by inputting the high-dimensional representations of the target texts and the high-dimensional representations of the acoustic features into a second self-attention module of the multi-task decoder based on the self-attention mechanism to obtain. The multi-task decoder is configured for calculating the mean value of the decoded representations to obtain the semantic vector representation of the corresponding task.

In some embodiments, the activation function of the first self-attention module of the multi-task decoder based on the self-attention mechanism uses GLU, each sub-layer performs layer normalization operation, and residual connection is performed between two sub-layers; using a dropout operation on a self-attention layer and a fully connected layer in the first self-attention module.

In some embodiments, the specific method for inputting the high-dimensional representations of the target texts and the high-dimensional representations of the acoustic features into the second self-attention module of the multi-task decoder based on the self-attention mechanism to obtain the final decoded representations of the multi tasks includes.

The high-dimensional representations of a target text is used as a query vector, high-dimensional representations of an acoustic feature is used as a key and a value, the element-wise cosine distance calculation is performed by using the query vector, the attention score of each key is obtained according to the size of the distance, and the value sequence is weighted and averaged by using the attention score of the key to obtain a context vector representation; in addition, the decoded representation is inputted to softmax function to obtain the target with the highest probability until the model converges.

In some embodiments, the system 100 also includes a semantic invariance constraint module 103.

The semantic invariance constraint module 103 is configured for: calculating the KL divergence of the semantic vector representations corresponding to the three target texts pairwise respectively to measure the consistency of the semantic vector distribution, to obtain the semantic constraint loss, and performing the semantic constraint by minimizing the consistency loss of the semantic vector distribution.

In some embodiments, the semantic constraint loss and the cross entropy loss are weighted and summed as the final target loss function.

Semantic constraint loss the weight is set to 0.1 and the cross entropy loss is set to 0.9 so that the model can learn high-level semantic information, and the semantic information can effectively improve the performance of speech recognition and speech translation.

In conclusion, compared with the prior art, the technical scheme of each aspect of the application has the following advantages:

(1) the error accumulation problem of serial system is avoided, and the calculation cost of the model is low and the real-time performance is very high; and (2) meanwhile, by using the characteristic of the semantic consistency of texts between different tasks, semantic constraints are imposed on the model to learn high-level semantic information.

Example 2

As shown in FIG. 1 and FIG. 2, the system 100 includes an acoustic encoder 101, a multi-task decoder 102, and a semantic invariance constraint module 103.

The acoustic encoder 101 is configured for receiving a down-sampled and re-encoded feature sequence, wherein the down-sampled and re-encoded feature sequence is obtained by: performing framing processing of speech waveform, with every 25 milliseconds being a frame, and there is a 10 millisecond overlap between frames, and after framing, 80-dimensional thank features are extracted as acoustic features of the speech waveform, to obtain an acoustic feature sequence, and then the acoustic feature sequence is down-sampled by performing convolution operation, and the convolution kernel is 3*3 with a step size of 2, and there is an activation function RELU after the convolution operation, which is used for nonlinear transformation, and each convolution operation downsamples the acoustic features to half of the original, and then uses a convolutional layer of two layers, and downsamples the acoustic features to a quarter of the initial sampling rate, and then maps the acoustic features to a 256-dimensional vector using a fully connected mapping layer; then positional encoding information is added to the vector sequence, positional encoding uses absolute positional representation to realize down-sampling and re-encoding of the acoustic feature sequence, and then the down-sampling and re-encoded feature sequence is inputted into a multi-head self-attention module of an acoustic encoder based on a multi-head self-attention mechanism, to obtain high-dimensional representations of acoustic features.

The multi-head self-attention module of the acoustic encoder based on the multi-head self-attention mechanism, the encoding module, is formed by stacking 12 sub-modules with the same structure, and each encoding module includes two sub-parts, one part is a multi-head self-attention layer, followed by a fully connected mapping layer, the number of heads is set to 4, the dimension of the fully connected layer is 1024, the activation function uses GLU, the layer normalization operation is performed on each sub-layer, the residual connection is carried out between two sub-layers, and use a dropout operation on the self-attention layer and the full-connection layer with a parameter being 0.1.

The multi-head attention mechanism extends the traditional attention mechanism and makes it have multiple heads, so that each head has a different role when participating in the encoder output. Specifically, multi-head attention independently calculates multiple attentions, and then connects their outputs to another linear projection; by the acoustic encoder, the original acoustic features are converted into high-dimensional feature representations.

The multi-task decoder 102 includes a decoder consisting of six identical multi-head attention-based modules, which have two attention modes.

The plurality of identical multi-attention-based modules include a first self-attention module and a second self-attention module.

Adding the task labels at the beginning of the plurality of target texts includes adding task labels <ASR>, <CHN> and <ENG> at the beginning of the target texts, which correspond to speech recognition task, Chinese translation task and English translation task respectively. The multi-task decoder 102 executes different tasks according to the task labels.

In some embodiments, word embedding mapping is carried out in the three target texts, to obtain a 256-dimensional target word vector sequence formed by corresponding target word vector representations. The encoded representation of the target text is obtained by adding positional encoding information and time sequence information to the target word vector sequence, and the high-dimensional representations of the target texts is then obtained by inputting the encoded representation of the target text into the first self-attention module of the multi-task decoder based on the self-attention mechanism. The final decoded representations of the three tasks is obtained by inputting the high-dimensional representations of the target texts and the high-dimensional representations of the acoustic features into a second self-attention module of the multi-task decoder based on the self-attention mechanism. The multi-task decoder is configured for calculating the mean value of the decoded representations to obtain the semantic vector representation of the corresponding task.

The activation function of the first self-attention module of the multi-task decoder based on the self-attention mechanism uses GLU, each sub-layer performs layer normalization operation, and residual connection is performed between two sub-layers; using a dropout operation on a self-attention layer and a fully connected layer in the first self-attention module.

In this part, the number of heads in the structure is set to 4, the dimension is 256, and the dimension of the fully connected layer is 1024. The activation function uses GLU, each sub-layer performs layer normalization operation, the residual connection is performed between two sub-layers, and the dropout operation is used for the self-attention layer and the fully connected layer, with a parameter being 0.1.

In some embodiments, the specific method for inputting the high-dimensional representations of the target texts and the high-dimensional representations of the acoustic features into the second self-attention module of the multi-task decoder based on the self-attention mechanism to obtain the final decoded representations of the multi tasks includes.

The high-dimensional representations of a target text is used as a query vector, high-dimensional representations of an acoustic feature is used as a key and a value, the element-wise cosine distance calculation is performed by using the query vector, the attention score of each key is obtained according to the size of the distance, and the value sequence is weighted and averaged by using the attention score of the key to obtain a context vector representation, as the final decoded representations of the multi tasks; in addition, the decoded representation is inputted to softmax function to obtain the target with the highest probability until the model converges.

The semantic invariance constraint module 103 is configured for: calculating the KL divergence of the semantic vector representations corresponding to the three target texts pairwise respectively to measure the consistency of the semantic vector distribution, to obtain the semantic constraint loss, and performing the semantic constraint by minimizing the consistency loss of the semantic vector distribution.

In some embodiments, the semantic constraint loss and the cross entropy loss are weighted and summed as the final target loss function.

Semantic constraint loss the weight is set to 0.1 and the cross entropy loss is set to 0.9 so that the model can learn high-level semantic information, and the semantic information can effectively improve the performance of speech recognition and speech translation.

Example 3

The present application discloses an electronic device, which includes any one of the first aspect of the end-to-end system for speech recognition and speech translation disclosed in the present application.

Figure 3:
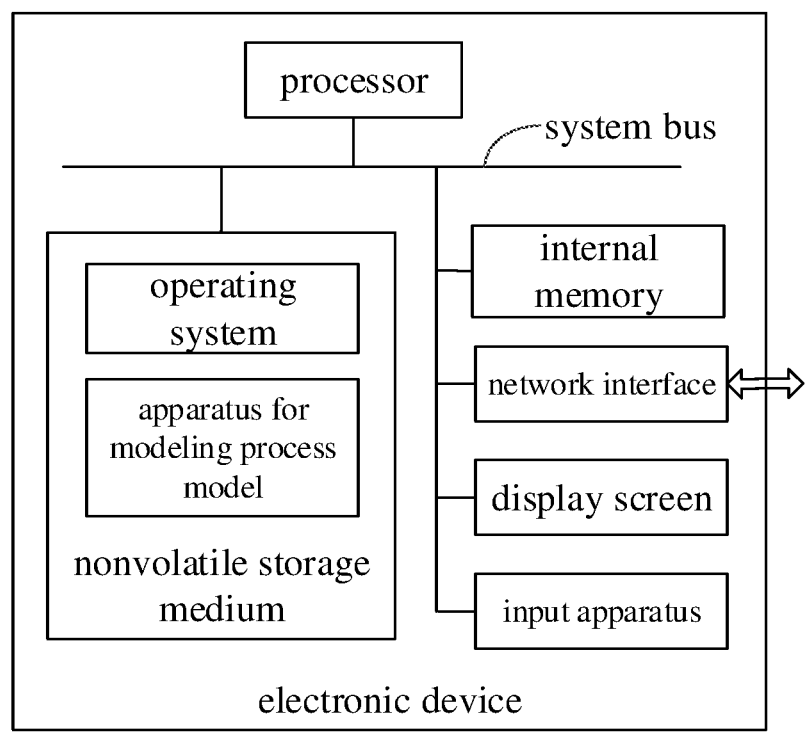
FIG. 3 is a structural diagram of an electronic device according to an embodiment of the present disclosure.

FIG. 3 is a structural diagram of an electronic device according to an embodiment of the present application, the electronic device includes a processor, a memory, a communication interface, a display screen and an input apparatus connected through a system bus. The processor of the electronic device is used to provide capabilities of computing and control. The memory of the electronic device includes a nonvolatile storage medium and an internal memory. The nonvolatile storage medium stores an operating system and a computer program. The internal memory provides an environment for the operation of an operating system and computer programs in the nonvolatile storage medium. The communication interface of the electronic device is used for communicating with external terminals in a wired or wireless manner, and the wireless manner can be realized by WIFI, operator network, near field communication (NFC) or other technologies. The display screen of the electronic device can be a liquid crystal display screen or an electronic ink display screen, and the input apparatus of the electronic device can be a touch layer covered on the display screen, a key, a trackball or a touch pad arranged on the shell of the electronic device, and an external keyboard, a touch pad or a mouse, etc.

Those skilled in that art may understand that the structure shown in FIG. 3 is only a structural diagram of a portion related to the technical aspect of the present disclosure and does not constitute a limitation to the electronic device to which the aspect of the present application is applied, and the specific electronic device may include more or fewer components than shown in the figure, or combine certain components, or have different component arrangements.

It should be noted that in each of the above embodiments, the technical features may be combined arbitrarily, and all possible combinations of the technical features in the above-mentioned embodiments have not been described for the sake of concise description. However, as long as there is no contradiction in the combinations of these technical features, they should be considered as within the scope described in this specification. The above examples are only expressed in several embodiments of the present application and the description thereof is more specific and detailed but is not therefore to be construed as limiting the scope of the application patent. It should be noted that a number of modifications and modifications may be made to those of ordinary skill in the art without departing from the concept of the present application, which fall within the scope of protection of the present application. Therefore, the scope of protection of the patent application shall be subject to the attached claims.

Embodiments of the subject matter and functional operations described in this specification may be implemented in digital electronic circuitry, tangibly embodied computer software or firmware, computer hardware including the structures disclosed in this specification and their structural equivalents, or a combination of one or more of them. Embodiments of the subject matter described in this specification may be implemented as one or more computer programs, i.e. one or more modules of computer program instructions encoded on a tangible non-transient program carrier to be executed by a data processing device or to control operations of the data processing device. Alternatively or additionally, program instructions may be encoded on an artificially generated propagation signal, such as a machine-generated electrical, optical, or electromagnetic signal, which is generated to encode information and transmit it to a suitable receiver device for execution by a data processing device. The computer storage medium may be a machine-readable storage device, a machine-readable storage substrate, a random or serial access memory device, or a combination of one or more of them.

The processes and logic flows described in this specification may be executed by one or more programmable computers executing one or more computer programs to perform corresponding functions by operating in accordance with input data and generating outputs. The processing and logic flow may also be performed by dedicated logic circuits, such as FPGA (Field Programmable Gate Array) or ASIC (Application Specific Integrated Circuit), and the apparatus may also be implemented as dedicated logic circuits.

A computer suitable for executing a computer program includes, for example, a general purpose and/or special purpose microprocessor, or any other type of central processing unit. Typically, the central processing unit will receive instructions and data from read-only memory and/or random access memory. The basic components of a computer include a central processing unit for executing or executing instructions and one or more memory devices for storing instructions and data. Typically, the computer will also include one or more mass storage devices for storing data, such as magnetic disks, magneto-optical disks, or optical disks, or the like, or the computer will be operably coupled to such mass storage devices to receive or transmit data therefrom, or both. However, computers do not have to have such equipment. In addition, the computer may be embedded in another device, such as a mobile phone, a personal digital assistant (PDA), a mobile audio or video player, a game console, a Global Positioning System (GPS) receiver, or a portable storage device, such as a Universal Serial Bus (USB) flash drive, to name just a few.

Computer-readable media suitable for storing computer program instructions and data include all forms of nonvolatile memory, media, and memory devices, such as semiconductor memory devices (e.g., EPROM, EEPROM, and flash memory devices), magnetic disks (e.g., internal hard disks or removable disks), magneto-optical disks, and CD ROM and DVD-ROM disks. The processor and memory can be supplemented by or incorporated into dedicated logic circuits.

Although this specification contains numerous specific implementation details these are not to be construed as limiting the scope of any application or the scope claimed but are intended primarily to describe the features of specific embodiments of a particular application. Certain features described within the specification in multiple embodiments may also be combined in a single embodiment. On the other hand, the various features described in a single embodiment may also be implemented separately in multiple embodiments or in any suitable sub-combination. Further, while features may function in certain combinations as described above and even initially so claimed, one or more features from the claimed combination may in some cases be removed from the combination and the claimed combination may point to a sub-combination or a variant of a sub-combination.

Similarly while operations are depicted in a particular order in the drawings this should not be construed as requiring that these operations be performed in the particular order or sequential order shown or that all illustrated operations be performed to achieve the desired results. In some cases, multitasking and parallel processing may be advantageous. Further, the separation of the various system modules and components in the above embodiments should not be understood as requiring such separation in all embodiments, and it should be understood that the described program components and systems may generally be integrated together in a single software product or packaged into multiple software products.

Thus specific embodiments of the subject matter have been described. Other embodiments are within the scope of the appended claims. In some cases, the actions described in the claims may be performed in a different order and still achieve the desired result. Further the processes depicted in the drawings are not necessarily in the particular order or sequential order shown to achieve the desired results. In some implementations, multitasking and parallel processing may be advantageous.

The foregoing is only a preferred embodiment of the present application and is not intended to limit the present application. Any modifications, equivalents, modifications, etc. made within the spirit and principles of the present application should be included within the scope of protection of the present application.

What is claimed is:

1. An end-to-end system for speech recognition and speech translation, wherein the system comprises:
    an acoustic encoder and a multi-task decoder;
    the acoustic encoder is configured for: extracting acoustic features of a speech waveform, to obtain an acoustic feature sequence, then performing a convolution operation and re-encoding operation on the acoustic feature sequence, to obtain a down-sampled and re-encoded feature sequence, and then inputting the down-sampled and re-encoded feature sequence into a multi-head self-attention module of the acoustic encoder based on a multi-head self-attention mechanism, to obtain high-dimensional representations of the acoustic features;
    the multi-task decoder comprises a plurality of identical multi-attention-based modules configured for: adding task labels at the beginning of a plurality of target texts, the multi-task decoder executing different tasks according to the task labels;
    the plurality of identical multi-attention-based modules comprise: a first self-attention module and a second self-attention module;
    re-encoding a plurality of target texts to obtain the encoded representations of the target file, and then inputting the encoded representations of the target file into the first self-attention module of the multi-task decoder based on the self-attention mechanism to obtain high-dimensional representations of the target texts; inputting the high-dimensional representations of the target texts and the high-dimensional representations of the acoustic features into the second self-attention module of the multi-task decoder based on the self-attention mechanism to obtain final decoded representations of multi tasks; calculating mean value of the decoded representations to obtain semantic vector representations of corresponding tasks;
    a specific method for adding the task labels at the beginning of the plurality of target texts comprises:
    adding the task labels <ASR>, <CHN> and <ENG> at the beginning of the target texts, which correspond to a speech recognition task, a Chinese translation task and an English translation task respectively.

2. The end-to-end system for speech recognition and speech translation according to claim 1, wherein the system further comprises: a semantic invariance constraint module;
    the semantic invariance constraint module is configured for: calculating KL divergence of the semantic vector representations corresponding to the plurality of target texts pairwise respectively to measure the consistency of semantic vector distribution, to obtain a semantic constraint loss, and performing semantic constraint by minimizing a consistency loss of the semantic vector distribution.

3. The end-to-end system for speech recognition and speech translation according to claim 2, wherein the semantic constraint loss and a cross entropy loss are weighted and summed as a final target loss function.

4. The end-to-end system for speech recognition and speech translation according to claim 1, wherein a specific method for performing the convolution operation and re-encoding operation on the acoustic feature sequence, to obtain the down-sampled and re-encoded feature sequence comprises:
    performing the convolution operation using a plurality of 2-dimensional convolution kernels on the acoustic feature sequence, and controlling a proportion of down-sampling by setting a step size of the convolution operation; after the convolution operation, connecting an activation function and carrying out a nonlinear transformation; superimposing a multi-layer convolution operation, then using a fully connected mapping layer to map the acoustic features into high-dimensional vectors, and then adding positional encoding information to a vector sequence, where the positional encoding is represented using an absolute position to realize the down-sampling and re-encoding of the acoustic feature sequence.

5. The end-to-end system for speech recognition and speech translation according to claim 1, wherein the multi-head self-attention module of the acoustic encoder based on the multi-head self-attention mechanism is formed by stacking a plurality of modules with the same structure, and a residual connection is carried out among each module with the same structure; each module with the same structure comprises two sub-parts, a specific structure of which comprises: a first sub-part is a multi-head self-attention layer, followed by a second sub-part which is a fully connected mapping layer, and a layer normalization operation is performed on each sub-part, and the residual connection is carried out between the two sub-parts.

6. The end-to-end system for speech recognition and speech translation according to claim 1, wherein the activation function of the first self-attention module of the multi-task decoder based on the self-attention mechanism uses GLU, each sub-layer performs the layer normalization operation, and the residual connection is performed between the two sub-layers; using a dropout operation on a self-attention layer and a fully connected layer in the first self-attention module.

7. The end-to-end system for speech recognition and speech translation according to claim 1, wherein a specific method for inputting the high-dimensional representations of the target texts and the high-dimensional representations of the acoustic features into the second self-attention module of the multi-task decoder based on the self-attention mechanism to obtain the final decoded representations of the multi tasks comprises:

using the high-dimensional representations of the target texts as a query vector, using the high-dimensional representations of the acoustic features as a key and a value, performing an element-wise cosine distance calculation by using the query vector, obtaining an attention score of each key according to a size of the distance, and weighting and averaging a value sequence by using the attention score of the key to obtain context vector representations as the final decoded representations of the multi tasks.

8. An electronic device, comprising the end-to-end system for speech recognition and speech translation according to claim 1.

* * * * *